United States Patent
Zahka et al.

(10) Patent No.: US 8,777,189 B2
(45) Date of Patent: Jul. 15, 2014

(54) METHOD AND APPARATUS FOR TREATING FLUIDS TO REDUCE MICROBUBBLES

(75) Inventors: Joseph Zahka, Andover, MA (US); Aiwen Wu, Malden, MA (US)

(73) Assignee: Entegris, Inc., Billerica, MA (US)

( * ) Notice: Subject to any disclaimer, the term of this patent is extended or adjusted under 35 U.S.C. 154(b) by 1405 days.

(21) Appl. No.: 11/919,110

(22) PCT Filed: Apr. 25, 2006

(86) PCT No.: PCT/US2006/015598
§ 371 (c)(1),
(2), (4) Date: Oct. 8, 2008

(87) PCT Pub. No.: WO2006/116385
PCT Pub. Date: Nov. 2, 2006

(65) Prior Publication Data
US 2009/0045140 A1  Feb. 19, 2009

Related U.S. Application Data (60) Provisional application No. 60/674,594, filed on Apr. 25, 2005.

(51) Int. Cl.
*B01F 3/04* (2006.01)

(52) U.S. Cl.
USPC ............ 261/102; 261/109; 95/260; 96/194

(58) Field of Classification Search
USPC ....... 261/95, 101, 102, 105, 109, 122.1, 123, 261/5; 95/260, 284; 96/204, 193, 194, 219; 210/718
See application file for complete search history.

(56) References Cited

U.S. PATENT DOCUMENTS

| | | | | |
|---|---|---|---|---|
| 912,310 | A | * | 2/1909 | Guttmann ...................... 261/94 |
| 3,466,151 | A | * | 9/1969 | Sicard et al. .................. 202/158 |
| 4,719,090 | A | * | 1/1988 | Masaki .......................... 422/310 |
| 4,828,587 | A | * | 5/1989 | Baurmeister et al. ............... 96/6 |
| 5,221,474 | A | * | 6/1993 | Yokono et al. ................ 210/436 |
| H1206 | H | * | 7/1993 | Thibodeaux et al. ........... 95/211 |
| 5,569,208 | A | | 10/1996 | Woelpper |
| 5,897,530 | A | | 4/1999 | Jackson |
| 6,210,611 | B1 | | 4/2001 | Needham |
| 6,383,373 | B1 | * | 5/2002 | Nakao et al. .................. 210/151 |
| 6,402,821 | B1 | | 6/2002 | Matsumaya |
| 6,631,890 | B1 | * | 10/2003 | Lau ................................ 261/94 |

(Continued)

FOREIGN PATENT DOCUMENTS

| | | |
|---|---|---|
| GB | 2303564 | 2/1997 |
| JP | 2001-121063 | 5/2001 |
| TW | 376528 | 12/1999 |
| TW | 590989 | 6/2004 |

OTHER PUBLICATIONS

International Search Report for PCT/US06/15598, Sep. 18, 2006.

(Continued)

*Primary Examiner* — Charles Bushey
(74) *Attorney, Agent, or Firm* — Sprinkle IP Law Group (57) ABSTRACT

Versions of the invention include methods for reducing microbubbles in liquids treated by heat or mass exchange devices. The exchange devices may be conditioned by having gases in crevices and surfaces displaced by a liquid. The methods can be used to prepare liquids with reduced numbers of microbubbles.

15 Claims, 5 Drawing Sheets

(56) References Cited

U.S. PATENT DOCUMENTS

| | | | |
|---|---|---|---|
| 6,666,436 B1* | 12/2003 | Lerner | 261/95 |
| 2005/0247198 A1* | 11/2005 | Kent | 95/241 |
| 2005/0279207 A1 | 12/2005 | O'Dougherty | |
| 2007/0119774 A1* | 5/2007 | Yen et al. | 210/500.1 |

OTHER PUBLICATIONS

Grant, Don, Factors affecting the generation, detection, and removal of microbubbles in liquids, Proccedings of the 23rd Annual Semiconductor Pure Water and Chemicals Conf., Santa Clara, CA, CTA Publication, Feb. 2004, 14 pgs.

Duffner, Jay, Defect Reduction in Top Antireflective Coating, Mykrolis, Billerica, MA, May 2004, Lit. No. AN1019ENUS, 13 pgs.

Written Opinion issued for PCT Patent Application No. PCT/US2006/015598, mailed Sep. 18, 2006, 3 pages.

International Preliminary Report on Patentability issued for PCT Patent Application No. PCT/US2006/015598, mailed Oct. 30, 2007, 4 pages.

Office Action issued for Taiwanese Patent Application No. 095114741, mailed Nov. 21, 2011, 11 pages.

Office Action issued for Japanese Patent Application No. 2008-509034, mailed Jun. 26, 2012, 14 pages.

Office Action issued for Korean Patent Application No. 10-2007-7027430, mailed Aug. 20, 2012, 9 pages.

Final Rejection issued for Japanese Patent Application No. 2008-509034, mailed on Jul. 2, 2013, 13 pages.

Wan, et al. "Sorption of Colloids, Organics, and Metals onto Gas-Water Interfaces: Transport Processes and Potential Remediation Tech." Proj. No. 55396-CA, Jun. 2008.

Wan, et al., Generation of Stable Microbubbles and Their Transport Through Porous Media, pp. 1173-1182. Water Resources Research, vol. 37, No. 5, May 2001.

Technology News "A View into Selet's 300 mm Program", Dec. 2000.

Osada et al. "Microbubble elimination during priming improves biocompatibility of membrane oxygenators," pp. H646-H652, 1978.

Amari et al. "Analyzing the efects of filter surface chemistry and morphology on 193-nm litho applications," 13 pgs, Apr. 17, 2006.

Krygier et al. "Automatic Particle Measurement in Liquids Downstream of Fine Membrane Filters," Microcontamination, 5 pgs, Apr. 1985.

Gotlinsky et al. "The effect of sub-0.1 µm filtration on 248nm photoresist performance," Solid State Technology, 4 pgs., Jul. 2000.

\* cited by examiner

METHOD AND APPARATUS FOR TREATING FLUIDS TO REDUCE MICROBUBBLES

CROSS REFERENCE TO RELATED APPLICATIONS

This application claims the benefit of U.S. Provisional Application Ser. No. 60/674,594, filed Apr. 25, 2005, titled "Method and Apparatus for Treating Fluids to Reduce Microbubbles" Aiwen Wu and Joseph Zahka inventors, the contents of which are incorporated herein by reference in their entirety.

DESCRIPTION

Bubbles, like particles, can cause point defects on semiconductor wafer surfaces. During processes such as photolithography, bubbles can cause problems in the coating and can for example act as a lens that focuses the light, thereby magnifying the error relative to the size of the bubble. Particles can be effectively removed from liquids by filtration. However, elimination of microbubbles from liquids is particularly challenging.

Microbubbles can be formed by surfaces when gas dissolved in the liquid nucleates a bubble on a surface. Without wishing to be bound by theory, because the pressure in small gas bubbles can be very high, it is unlikely for the gas bubbles to form spontaneously. The bubbles may form or grow on a surface where the radius of curvature of the bubble can be relatively high so the pressure in the bubble can be lower. Bubbles can form on surfaces when the pressure in the liquid drops and gas comes out of solution. If the fluid is not saturated with gas, bubbles will not form. If there is low pressure drop in the system, bubbles are less likely to form as well.

Approaches in embodiments of the invention for reducing microbubbles in liquids include minimizing the nucleation sites for bubbles. One approach deals with the surfaces in contact with the liquid including exchange device housings, membrane surfaces, and tubing walls. The surface can be wet by the liquid or it can be formed with reduced number of surface cracks or be essentially free from surface cracks. The wetting nature of the surface interaction with the liquid allows liquid to coat the surface and displace air pockets in surface. If there is air trapped in crevices of the device surface, the wetting nature of the fluid will allow the liquid to flow into the crack. The liquid can put pressure on the gas in the crack. According to Henry's Law, the higher the pressure, the more gas that can be dissolved into the liquid.

One embodiment of the invention is an apparatus comprising an exchange device that can have one or more microbubble nucleating and or microbubble trapping surface features. The exchange device includes exchange surfaces within a housing, and the housing can have one or more inlet and outlets for various fluids utilized or treated by the exchange device. In some embodiments the housing can include a liquid inlet and a liquid outlet and optionally other fluid ports such as vents or drains. The apparatus that produces fluid treated by the exchange device can further comprise a conduit to provide the treated liquid to a substrate.

The apparatus further includes a liquid treated by the exchange device where the liquid is in contact with the surface features of the exchange device. The contact or disposition of the liquid with the surface features of the exchange device in the apparatus reduces the amount of microbubbles in the liquid from the surface features of the exchange device to an amount that is lower than the amount microbubbles in the liquid from the surface features of the exchange device that would be in the liquid in the absence of the contact of the liquid with surface features of the exchange device.

In some embodiments of the apparatus, the contact of the liquid with the surface features of the exchange device displaces gas from the surface features of the exchange device. In some embodiments of the apparatus, the contact of the liquid with the surface features of the exchange device dissolves gas trapped or located in the surface features of the exchange device into the liquid. In some embodiments the contact of the liquid with the surface features includes a combination of displacing and dissolving.

One embodiment of the invention is a method that can comprise contacting one or more bubble nucleating and or trapping surface features of an exchange device with a liquid such that the contacting or disposing of the liquid on the exchange surfaces reduces or lowers the number of microbubble particle counts resulting from the liquid contacting the surface features of the exchange device. The contacting lowers the number of microbubble particle counts to an amount that is lower in number than would be achieved in the absence of the contacting of the liquid with surface features of the exchange device. In some embodiments, the contacting comprises displacing gas from the surface features of the exchange device by the liquid. In other embodiments, the contacting comprises dissolving gas from the surface features of the exchange device into the liquid. In some embodiments the contacting of the liquid with the surface features includes a combination of displacing and dissolving acts.

The method can further comprise or include the act of exchanging mass, energy, or a combination of these between the liquid and exchange device. For example, the exchange device may be a filter that removes particulate, gel, or ionic contaminants from the liquid. The exchange device may be a hollow tube heat exchanger that adds heat to the liquid and/or removes heat from the liquid. The exchange device may include a filter and heat exchanger in series to remove particulate or sievable materials and or ionically charged materials and that also adds or removes heat from the liquid to condition it prior to coating or dispensing the treated liquid onto one or more substrates.

Contacting the liquid with the surface features of the exchange device may include the act of pressurizing the liquid contacting the surfaces of the exchange device to displace or dissolve gas in surface features of the exchanger into the liquid.

One embodiment of the invention is a method that can comprise the act of contacting one or more bubble nucleating and or trapping surface features of a porous or microporous membrane in a housing with a liquid used to treat a wafer, the manner of contacting lowers the number of microbubble particle counts from the surface features of the porous membrane introduced into the liquid. This number of counts is lower than in the absence of the contacting of the liquid with the surface features of the porous membrane. The method can further include the act of filtering the liquid.

In some embodiments, the contacting comprises displacing gas from the surface features of the porous membrane. In other embodiments the contacting comprises dissolving gas from the surface features of the porous membrane into the liquid.

The method may be used to treat liquids that include an organic solvent or a surfactant. The method can be used to treat a liquid used in a lithography process such as an antireflective coating (top and bottom), a photoresist, or a developer.

One method for minimizing the nucleation sites for bubbles is to fill the voids with fluids. This may be achieved by filling the voids with fluid and may be done by displacing air in the voids with liquid. For example, if an exchange device such as a filter is subject to a reduced pressure to remove gas from the device and crevices of the membrane and is then filled with liquid, the liquid may go into the crevices of the membrane. In another example, it may be possible to pressurize the fluid and push the liquid into the crevices of the device where gas is trapped. These methods and treatments may be used separately or combined. They may also be used with other methods to decrease or displace gas trapped in device surfaces and crevices such as but not limited to contacting the membrane with a solvent vapor or contacting the device with a degassed solvent. As a result of these treatments, liquids that contact the exchange device surfaces have reduced microbubble content or microbubbles substantially eliminated from the liquid. Eliminating microbubbles can reduce downtime of equipment for maintenance. In some cases, the start up process of an apparatus with an exchange device, for example a fluid pump with a particle filter, can be modified to reduce the outgassing or formation of microbubbles in a fluid delivered by the pump. The displacement of gases from the liquid contacting surfaces of exchange devices permits existing pump and filtration technology to be used to optimize pump operation.

Versions of the invention include methods and an apparatus for reducing microbubbles in liquids treated by heat or mass exchange. In some embodiments the liquid can be characterized as a liquid that has a different surface energy from the surface of the exchange device that can result in heterogeneous nucleation of gas bubbles or microbubbles in the liquid from surface features of the exchange device. Examples of liquids may include but are not limited to photochemicals, organic solvents, reagents and coating compositions that include an organic solvent, reagents for cleaning and coating substrates that may also include surfactants. The method and apparatus may be used to treat a liquid used in a lithography process such as an antireflective coating, a photoresist, or a developer. Treatment of the liquids by heat exchange, mass exchange, or a combination of these may include but are not limited to contacting the liquid with structures such as porous membranes, hollow fibers, membrane diaphragms, tubing and or combinations of these and other structures. In one embodiment, microbubbles or their transfer into a liquid may be reduced in a filter or other high surface area structure that contacts the liquid like a heat exchange device, by pressuring the filter or high surface area structure after wetting with the liquid that is treated by the filter or high surface area device. In another embodiment, a portion of the gas in the filter housing and membrane or other high surface area structure is removed prior to wetting with the liquid.

Versions of the invention include compositions produced having reduced amounts of microbubbles in liquids treated by heat exchange devices, mass exchange devices like filters, and other devices having surfaces that can serve to nucleate bubbles in liquids. Examples of treated liquid compositions with reduced amounts of microbubbles or that are substantially free of microbubbles may include but are not limited to photochemicals, organic solvents, reagents and coating compositions that include an organic solvent, reagents for cleaning and coating substrates that may also include surfactants.

In one embodiment, microbubbles or their transfer into the liquid from the device surfaces may be reduced in a filter or other high surface area structure that treats or transports the liquid, by pressuring the filter or high surface area structure after wetting with the liquid that is treated by the filter or high surface area device. In another embodiment, a portion of the gas in the filter housing and membrane or other high surface area structure is removed prior to wetting with the liquid; optionally after wetting with the liquid, the liquid may be pressurized. In another embodiment gas in the filter housing and membrane or other high surface area structure is exchanged with a gas or vapor that is highly soluble in the liquid to be treated; optionally the liquid that contacts the structure may be pressurized.

One embodiment of a composition can include a volume of liquid filtered by a 0.05 micron or smaller pore size rated filter that can be characterized as having less than 1 particle count for each milliliter of the fluid where the size of the particle is greater than about 0.2 microns. The composition may further include a substrate in contact with the liquid and the substrate may include copper, silicon, aluminum, or silicon dioxide. The composition liquid may include an organic solvent, a surfactant, a dispersed polymer, a soluble polymer, coating compositions, compositions used in photolithography processes, and other liquids.

One embodiment is a method that includes the acts of displacing gas from a porous membrane in a housing and covering the porous membrane with a liquid. The method may further include the act of filtering the liquid with the porous membrane, or dispensing the liquid filtered by the porous membrane onto a substrate. The method may include the act of pressurizing the liquid covering the porous membrane. The method may include the act of applying the liquid filtered with a 0.05 micron or smaller pore size rated porous membrane onto a substrate, the liquid characterized as having less than 1 particle count for each milliliter of the applied liquid, the particle size being greater than about 0.2 microns.

One embodiment of an apparatus can include a 0.05 micron or smaller pore size rated porous membrane in a housing with a liquid, where the liquid filtered by the porous membrane can be characterized as having less than 1 particle count for each milliliter of the liquid filtered, the particle size being greater than 0.2 microns. The apparatus can further comprise an outlet like a nozzle or other suitably shaped tube to provide the filtered liquid to a substrate.

One embodiment of the invention is a kit with a treatment device like a filter or heat exchange device that can be used alone or as part of a larger apparatus to prepare treated liquid. In an embodiment with a 0.05 micron or smaller pore size rated filter, the liquid can be characterized as having less than 1 particle count for each milliliter of the liquid filtered, the particle size being greater than 0.2 microns. The kit can include the treatment device and instructions or access to instructions for installing the treatment device to reduce the number of microbubble counts from the surface of the exchange device. The treatment device may be installed in an apparatus or conduit and include acts for displacing gas from the treatment device and wetting the treatment device with a liquid.

Another embodiment of a composition can include a liquid treated by an exchange device in a housing. The exchange device can be but is not limited to a porous membrane, hollow fibers, or other surface in contact with the liquid in the housing. The gas in the housing and contact surface is displaced by the liquid so that the heat exchanged or mass exchanged liquid has less than 1 particle count for each milliliter of the liquid treated by the membrane in the device. One embodiment of a composition can include a liquid filtered by a 0.05 micron or smaller pore size rated porous membrane in a housing, the gas in the membrane and housing displaced by the liquid so that the filtered liquid has less than 1 particle count for each milliliter of the liquid filtered by the 0.05 micron or smaller pore size rated microporous membrane, the particle count size in the liquid being greater than 0.2 microns. The liquid in the housing and membrane may be subject to an external pressure. The treated liquid may include but is not limited to photochemicals, organic solvents, reagents and coating compositions that include an organic solvent, reagents for cleaning and coating substrates that may also include surfactants. The composition may further include a substrate onto which the treated liquid is applied or dispensed.

These and other feature, aspects, and advantages of the present invention will become better understood with regard to the following description, appended claims, and accompanying drawings.

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It is to be noted that as used herein and in the appended claims, the singular forms "a", "an", and "the" include plural reference unless the context clearly dictates otherwise. Thus, for example, reference to a "microbubble" is a reference to one or more microbubbles and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of embodiments disclosed, the illustrative methods, devices, and materials are now described.

"Optional" or "optionally" means that the subsequently described event or circumstance may or may not occur, and that the description includes instances where the event occurs and instances where it does not.

The methods or acts for displacing gases from liquid conditioning devices like heat exchangers, tubing, filters, or other high surface area devices that contact liquids can be used where it is beneficial to reduce or prevent the formation of microbubbles in liquids conditioned by the devices. The methods or acts result in effective prevention or reduction of microbubbles in a liquid treated by the conditioning device. Liquids can be treated by the exchange device and can include but is not limited to heat exchange, mass exchange (mass exchange includes but is not limited to filtration, adsorption of contaminants, chemisorption of contaminants from the fluid, chemical addition to the fluid), or a combination of these and other treatments such as photochemical or electrochemical treatment of the liquid.

The methods or acts may be used to prepare liquid compositions that can be characterized as having less than 1 particle count from a microbubble for each milliliter of the fluid where the size of the particle or particle count is greater than about 0.2 microns. The composition may further include a substrate that the liquid has been dispensed on or applied to. The substrate may be stationary or rotating. The substrate can be but is not limited to a semiconductor wafer or a flat panel display screen. The substrate may include metals or alloys including copper, silicon, or aluminum. The substrate may include dielectrics like silicon dioxide, fluorine containing dielectrics, low k dielectrics, and high k dielectrics. The composition liquid may include an organic solvent, a surfactant, a dispersed polymer, a soluble polymer, coating compositions, compositions used in photolithography processes, and other liquids.

Versions of the invention include compositions produced by treating the liquid with an exchange device that has been contacted with a liquid in such a manner as to reduce the number of microbubbles in the liquid that result from surface features of the exchange device. These surface features can be microbubble nucleating and or microbubble trapping surface features. The exchange device can include heat exchange devices like hollow tube heat exchangers, mass exchange devices like filters (including tangential flow), combinations of these or other devices having exchange surfaces with surface features that can serve to nucleate or trap gas in these surface features. These nucleated gas microbubbles or pockets of trapped gas can be released or shed into the liquid being treated by the exchange device and be observed as particle counts. The exchange device may be contained in a housing that has one or more fluid inlet and outlet ports and other optional ports such as one or more drains, sample ports, or vent ports. The exchange device housing may be coupled to a device that transports the liquid such as conduits, a variety of pumps or liquid feed systems such as but not limited to diaphragm based pumps, paddle wheels, flexible containers that can be compressed to transport the liquid, peristaltic pumps, centrifugal pumps, or pressure based systems. In various embodiments, the liquid treated by the exchange device flows over the surface features of the exchange device.

The contacting or disposing of the liquid on the exchange surfaces reduces or lowers the number of microbubble particle counts in the liquid from the surface features of the exchange device. The contact of the liquid that reduces in the number of microbubble counts in the liquid can include displacing gas from surface features, soaking the exchange unit in the fluid for a predetermined time, pressurizing fluid in contact with the exchange surfaces, or combinations including these acts. One method for minimizing the nucleation sites for bubbles from the exchange device is to fill the voids with liquid. This may be achieved by filling the voids with liquid, for example by displacing air in the voids with the liquid. In another embodiment, an exchange device such as a filter may be subject to a reduced pressure to remove some portion of gas from the device surface features that trap or nucleate microbubbles like pores and crevices of the membrane after which the membrane can be contact with the liquid. In another embodiment, the liquid can be pressurized to push the liquid into the crevices of the device where gas is trapped to displace the gas and or to dissolve trapped gas of the surface features into the liquid. In some embodiments the liquid may be degassed prior to contacting the exchange device, trapped gas in the surface features can dissolve into the gas deficient liquid. In other embodiments, the exchange device may be contact with a highly soluble gas or a solvent vapor to displace gas from the surface features of the exchange device. These acts of contacting the exchange device with the liquid or vapor may be used separately or combined. As a result of these acts or treatments, liquids that contact the exchange device surfaces have reduced microbubble content or microbubbles are substantially eliminated from the liquid.

The acts for reducing microbubbles in the liquid are not limited to any particular order, in some cases they can occur simultaneously. For example, the exchange device may first be subject to a reduced pressure to remove gas from bubble nucleating surface features and then contacted with a liquid. In one embodiment, microbubbles or their formation in a liquid may be reduced in a filter or other high surface area structure that contacts the liquid like a heat exchange device, by pressuring the filter or high surface area structure after immersing the exchange device in the liquid that is treated by the filter or high surface area device. Alternatively, the bubble nucleating surface features may be contacted with a liquid under pressure. In still other embodiments, a combination of reduced pressure, liquid contacting, and pressure can be used. Other combinations of these acts are also possible to reduce the amount of gas from nucleating surface features of the exchange device that can be transferred or shed into the liquid. Exchange devices contacted with the liquid in these or similar manners can provide treated liquids having low particle counts due to bubbles or microbubbles. These liquids can subsequently be dispensed onto a substrate or surface of an article.

The bubbles or microbubbles that are reduced in the liquid as a result of these kinds of contacting acts are from surface features of the exchanger that can trap or nucleate microbubbles (heterogeneous bubble formation) as compared to bubbles generated from within the liquid caused by precipitation due to a pressure drop (homogeneous bubble formation). These heterogeneous nucleated gas microbubbles or pockets of trapped gas that can be released or shed into the liquid may be distinguished from homogeneously nucleated microbubbles because the amount or counts due to microbubbles derived from exchanger surfaces will depend upon the area of the exchange device and differences in surface energy rather than the volume of liquid in the system or apparatus.

Bubbles can be nucleated in features of the exchange device when the surface energy between the exchange device surfaces and the liquid are different enough to prevent complete wetting of the exchange device surface features. Depending upon the difference in surface energy between the liquid and exchange device and the dimensions of the microbubble nucleating surface feature, liquid can be excluded from these exchange device surface features during initial wetting with the liquid and any gas trapped by the liquid in the features can be slowly shed or released over time into the liquid as bubbles and or microbubbles. The effectiveness of various liquid contacting acts on the reduction of microbubbles from an exchange device can be determined using a particle counter to monitor the decay in particle counts due to microbubbles with time. Microbubbles in a liquid will generally have a size distribution when plotted on a log-log scale with a slope of less than the slope of about −2 to −4 observed for hard particles; typically microbubbles provide a slope of about −1. Microbubbles release or shed from exchange devices may also be detected ultrasonically.

Figure 2:
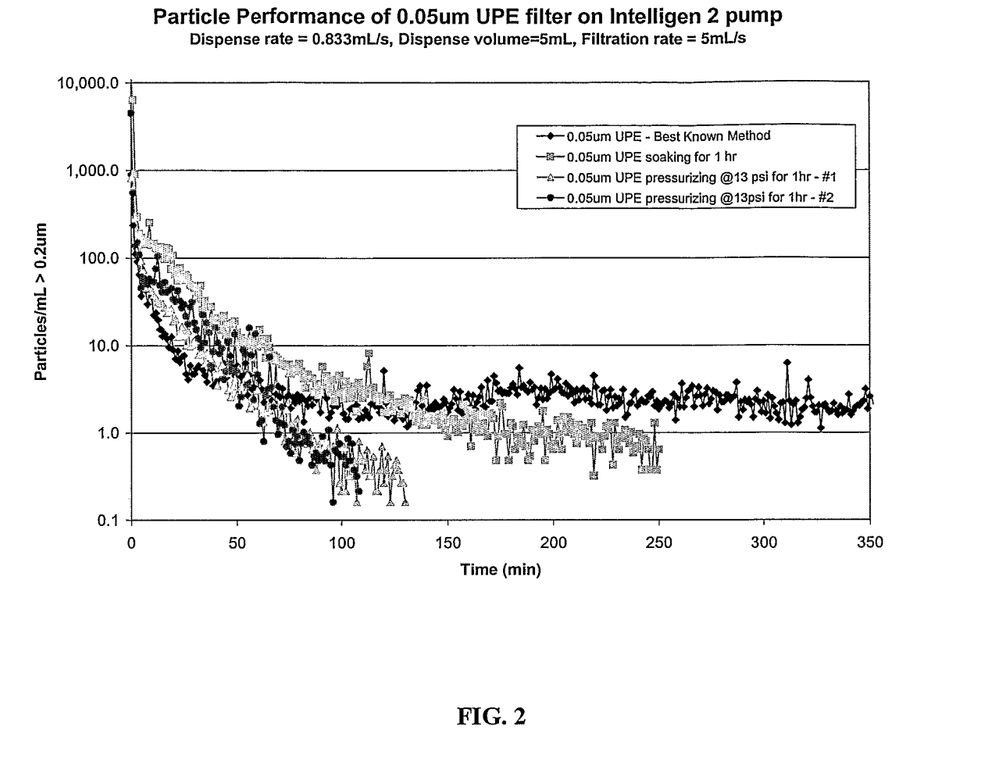
FIG. 2 illustrates experimental particle count data characterizing compositions and methods for making them that can have less than 1 particle count for each milliliter of the liquid treated by the membrane, the particle count size in the liquid greater than 0.2 microns. The graph illustrates particle performance of 0.05 µm UPE filter by plotting Particles/mL>0.2 microns vs Time for different liquid and exchange treatments such as soaking, or pressurizing.
Figure 3:
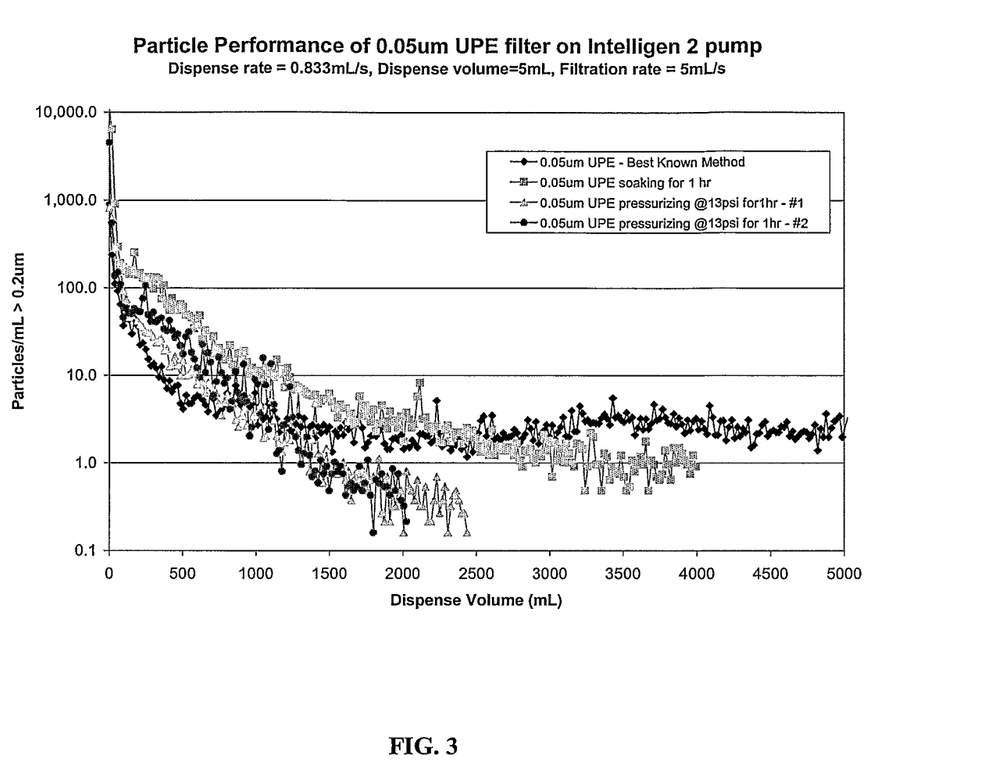
FIG. 3 illustrates experimental particle count data characterizing compositions and methods for making them that can have less than 1 particle count for each milliliter of the liquid treated by the membrane, the particle count size in the liquid greater than 0.2 microns. The graph illustrates particle performance of 0.05 µm UPE filter by plotting Particles/mL>0.2 microns vs Dispensed volume of liquid for different liquid and exchange treatments.
Figure 4:
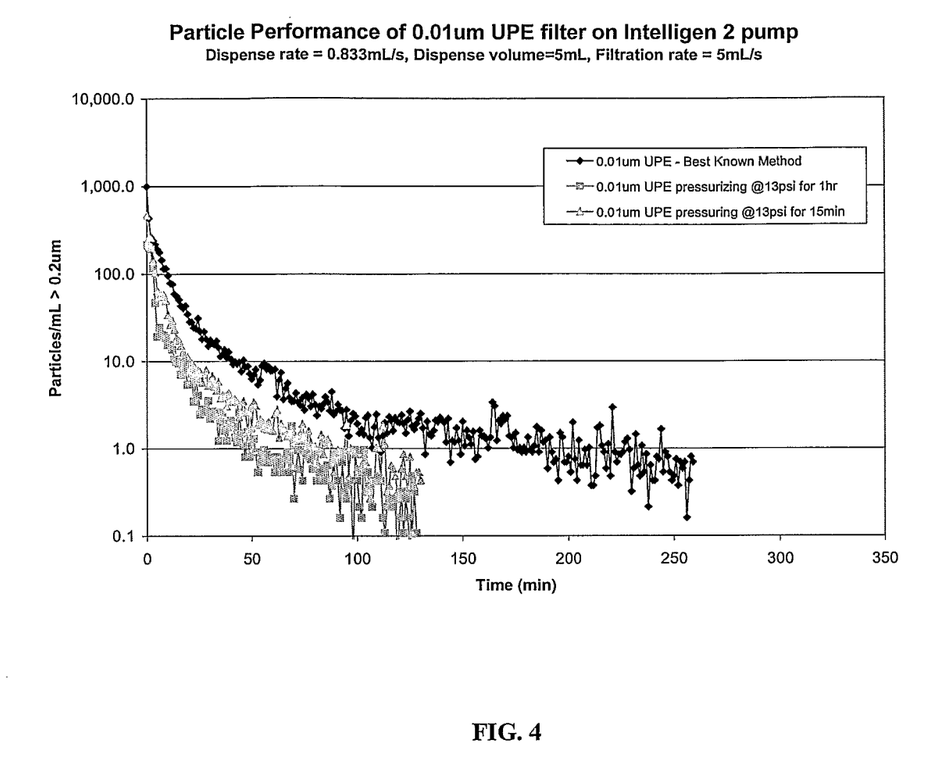
FIG. 4 illustrates experimental particle count data characterizing compositions and methods for making them that can have less than 1 particle count for each milliliter of the liquid treated by the membrane, the particle count size in the liquid greater than 0.2 microns. The graph illustrates particle performance of 0.01 µm UPE filter by plotting Particles/mL>0.2 microns vs Time for different liquid and exchange treatments.
Figure 5:
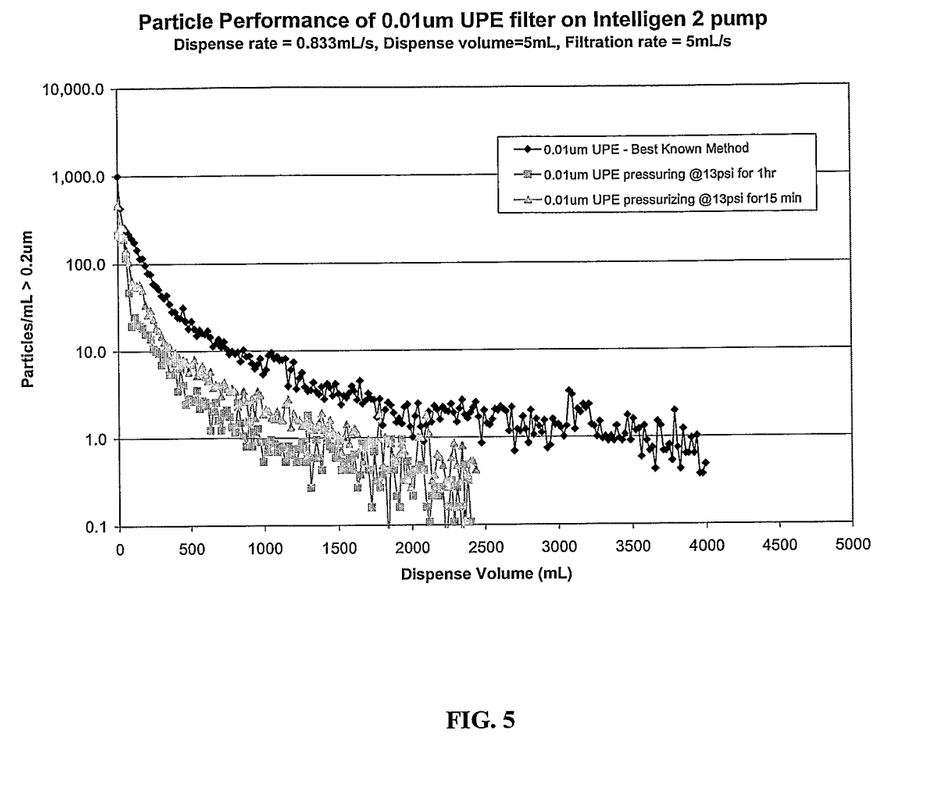
FIG. 5. illustrates experimental particle count data characterizing compositions and methods for making them that can have less than 1 particle count for each milliliter of the liquid treated by the membrane, the particle count size in the liquid greater than 0.2 microns. The graph illustrates particle performance of 0.01 µm UPE filter by plotting Particles/mL>0.2 microns vs Dispensed volume of liquid for different liquid and exchange treatments.

As can be seen in FIGS. 2-5, the number of particle counts decreases and levels off after an amount of time or volume flow of material through the exchange device. However as shown in FIG. 2 or FIG. 3, an exchange device treated by the contacting acts in embodiments of the present invention achieves the lowest number of particle counts due to microbubbles and achieves that number more quickly in the liquid as compared to a control exchange device that was not similarly treated by the contacting acts in embodiments of the invention. A similar effect is illustrated in FIG. 4 or FIG. 5 for an exchange device with a smaller rated pore size compared to FIG. 2. The lowest number of particle counts is a level or amount achieved after a predetermined volume of liquid has been treated or a predetermined amount of time that the exchange device has been used. In some embodiments the contact of liquid with the exchange device results in fewer than about 1 microbubble particle count of size greater than about 0.2 microns per milliliter of liquid treated at a flow rate of less than 1 ml/sec in less than 100 minutes. In some embodiments the contact of liquid with the exchange device results in fewer than about 1 microbubble particle count of size greater than about 0.2 microns per milliliter of liquid treated at a flow rate of less than 1 ml/sec in less than 50 minutes. In some embodiments the contact of liquid with the exchange device results in fewer than about 1 microbubble particle count of size greater than about 0.2 microns per milliliter of liquid treated after less than about 30 hold-up volumes of liquid has been treated by the exchange device as illustrated in FIG. 3. In some embodiments the contact of liquid with the exchange device results in fewer than about 1 microbubble particle count of size greater than about 0.2 microns per milliliter of liquid treated after less than about 20 hold-up volumes of liquid has been treated by the exchange device as illustrated in FIG. 5.

In embodiments of the invention, the exchange device may be part of a larger apparatus. For example, a filter or a heat exchanger may be combined with a fluid pump to deliver exchanged fluid to a substrate. The pump and one or more exchange devices may be part of a larger system such as a lithography track. In some embodiments, the apparatus or method comprising a pump or other liquid displacement device can be used to transfer liquid to and from the exchange device and onto a substrate or into a second volume of liquid where it is desirable to minimize the amount of microbubbles in the treated liquid.

The area of the exchange device can be chosen to provide the amount of heat and or mass exchange with a liquid suitable for the flow rate and pressure of the liquid in the application. In some embodiments of the invention, the area of the exchange device can be greater than about 100 cm$^2$ in other embodiments it can be greater than about 1,000 cm$^2$, and in still other embodiments greater than about 10,000 cm$^2$. The contact of the liquid with the surface features of these exchange devices reduces the heterogeneous nucleation of bubbles and or microbubbles that can be released or shed into the liquid treated by the exchange device.

The apparatus can further include a liquid treated by the exchange device where the liquid is in contact with one or more surface features of the exchange device. The contact or disposition of the liquid with the one or more surface features of the exchange device in the apparatus is such that it reduces amount of microbubbles in the liquid from the surface features of the exchange device to an amount that is lower than the amount microbubbles that would be in the liquid in the absence of the contact of the liquid with surface features of the exchange device.

Microbubble particle counts is intended to refer to gas bubbles with an average diameter of less than 1 mm, in some embodiments less than or equal to 50 microns, in other embodiments less than about 1 micron, and in still other embodiments about 0.2 microns or less in size.

Where the exchange device includes a porous membrane, the membrane can have a structure that removes target materials such as microorganism, particles, gels, or other target material from a feed fluid to a desired level in the permeate. In some embodiments the structure of the membrane can be chosen to retain 99% (2 LRV) or more of the target material in the application by sieving from the feed fluid. In some embodiments the filter has a rated pore size, an LRV of about 2 or more for 0.05 micron or smaller target materials, in other embodiments the filter has an LRV of about 2 or more for 0.01 microns or smaller target materials.

Various aspects of the present invention will be illustrated with reference to the following non-limiting examples. The examples below are merely representative of the work that contributes to the teaching of the present invention, and the present invention is not to be restricted by the examples that follow.

EXAMPLE 1

This example describes general test procedures and materials used for some embodiments of the invention. Tests in these examples were performed using the solvent ethyl lactate, which has viscosity 2.4 cP and surface tension 28.6 dynes/cm at room temperature. Other liquids may also be tested under similar conditions and may include but are not limited to photochemicals including photoresists, top and bottom antireflective coatings, spin on dielectrics, various solvents including organic molecules or including water, reagents and coating compositions that include an organic solvent, reagents for cleaning and coating substrates that may also include surfactants.

The test setup incorporated the following equipment: Intelligen® Photochemical Dispense System available from the Mykrolis Corporation (Billerica, Mass.), CKD stop/suckback valve, Tektronix® TDS3032 oscilloscope with Omega® Omni-Amp® III signal amplifier, PMS Liqualaz SO2 particle counter, 0.05 μm (micron) IMPACT® Plus filters, 0.01 μm IMPACT® Plus filters, and Assist® Flushing Shell available from the Mykrolis Corporation (Billerica, Mass.), one liter Savillex PFA container, ¼" OD PFA tubing.

The Intelligen® pump was set to dispense 5 ml of fluid at 0.833 ml/s. The purge volume was 0.2 ml and the dispense rate was 0.2 ml/s. The feed time was set to 3 seconds. The vent time was set to 1 second, and the filtration rate was set at 5 ml/s. Both venting and purging occurred during each cycle. The feed pressure was about 13 psi.

Figure 1:
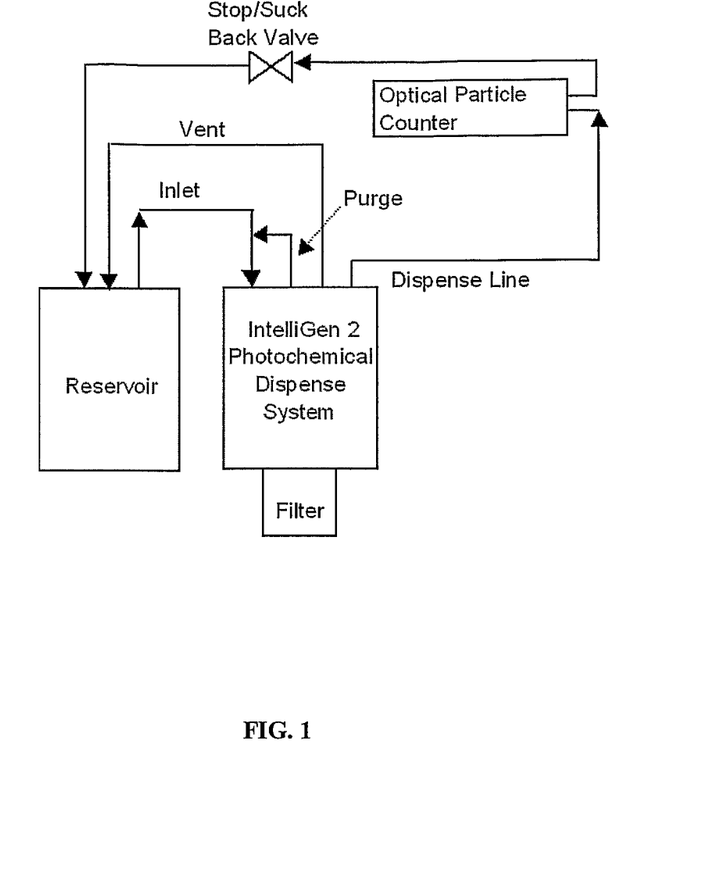
FIG. 1 is a schematic illustration that includes a non-limiting example of a mass exchange device that is a porous membrane in a housing. The exchange device is part of an apparatus that can be used to deliver volumes of treated fluid onto a substrate. The treated fluid can have less than 1 particle count for each milliliter of the liquid filtered by the membrane, the particle count size in the liquid greater than 0.2 microns.

As illustrated in FIG. 1, the outlet line of the dispense system was connected to a Liquilaz SO2 optical particle counter. The smallest channel on the particle counter is 0.2 μm (microns). The particle counter cannot readily distinguish between bubbles and particles. A method to distinguish between particles and microbubble counts was developed where each new filter was installed after the particle counts reached very low background with a filter in place, the particle levels shown by the counter indicated the level of microbubbles in the dispense line during the testing. The experimental setup sketch is shown in FIG. 1.

Various treatments were used on the exchange device surfaces. The Best Known method was used as a baseline to compare treatments for reducing particle counts with various filter startup procedures. The "Best Known" method was defined as: 5 times Prime to Vent to introduce fluid into the filter after installation and then start the priming instantly with a programmed recipe. Soaking filter for 1 hour after upstream wetting: after filter installation and upstream wetting by performing 5 times Prime to Vent, the filter was kept in place for 1 hour. Then the priming was started. Pressurizing the fluid after installation and upstream wetting. These conditions were used to demonstrate that pressuring the filter contributes to improved filter start up. This set of conditions were used to demonstrate that by providing a constant pressure to the fluid after wetting the upstream of the filter by Prime to Vent operation, the filter would have fast startup. Also, the time of pressurizing the fluid was varied to look into the effect of pressurizing time on filter startup.

The experimental procedure for demonstrating embodiments of the invention included a microporous filter exchange device on a pump and comprised dispensing liquid using the programmed recipe of the pump with a filter in place until background of the system reaches less than 1 particle count/mL>0.2 μm and counts stabilize; stop the system and replace the filter with a new filter; running "Prime to Vent" for 5 times to introduce the fluid into the filter. The following tests were performed and the results summarized in FIGS. 2-5.

Test #1 Start the dispense instantly (FIGS. 2-5)

Test #2 Let filter soak for 1 hour, then start the dispense. (FIGS. 2-3)

Test #3 Pressure the fluid using the pump default feed chamber pressure setting 13 psi for 1 hour or 15 min, then start the dispense (FIGS. 2-5)

Stop the test when the system reaches less than 1 particle/mL>0.2 μm and counts stabilize.

Table 1 provides a summary of the particle data for this testing in the Examples. It shows that letting filter soak for 1 hour after installation provides reduced particle counts over installing filter and instantly introducing fluid upstream. However, providing a constant pressure to the fluid after wetting the upstream of the filter could be used to slowly and effectively push fluid into the crevices or other surface features of the membrane and housing that could typically cause nucleation sites for microbubbles. A similar method could be used to displace gases trapped in other exchange devices and surfaces that contact the liquid. The benefit of displacing gas from the filter or other exchange device is that exchange device startup time can be improved and microbubbles in the liquid reduced to low levels quickly overtime as illustrated in FIGS. 2-5 and summarized in Table 1. It is expected that similar benefits to startup could be achieved for other devices used to treat or condition liquids such as heat exchangers, hollow fiber contactors, filters, or electrodes enclosed by membranes.

TABLE 1

Test result summary.

| Tested filter | Testing condition | Time to reach 1 part/mL >0.2 μm (min) | Dispense volume to reach 1 part/mL >0.2 μm (mL) |
|---|---|---|---|
| 0.05 μm UPE | Best Known | 400 | 7500 |
| 0.05 μm UPE | Soaking for 1 hour | 200 | 3700 |
| 0.05 μm UPE, #1 | Pressurizing @ 13 psi for 1 hour | 75 | 1400 |
| 0.05 μm UPE, #2 | 7 Pressurizing @ 13 psi for 1 hour | 75 | 1400 |
| 0.01 μm UPE | Best Known | 200 | 3700 |
| 0.01 μm UPE | Pressurizing @ 13 psi for 1 hour | 50 | 900 |
| 0.01 μm UPE | Pressurizing @ 13 psi for 15 mm | 75 | 1400 |

The effect of increasing pressure applied on the liquid after wetting the device with liquid is expected to reduce the formation of microbubbles in the liquid. The pressure applied to the liquid is within the operating limits of the device so that components are not damaged by the pressure. The pressure applied to the liquid is within the operating limits of the apparatus that utilizes the liquid so that the apparatus is not caused to malfunction by the external pressure or pressure differential. The best pressure for a particular device will depend upon the liquid that contact the device (surface energy compared to the surface of the device) temperature, and gas in the crevices of the device. The pressure can be determined by an operator. In the examples, the current manufacturing setting of the feed chamber pressure of the Intelligen 2 pump was 13 psi.

Where it is desirable to minimize fluid loss as particle counts decrease, the fluid may be recycled to a reservoir, for example via a vent line as illustrated in FIG. 1. This recycling of fluid may continue until the number of particle counts and size are below process specifications. A valve may be used to switch fluid between the reservoir and the process dispense point.

The particle data reported in FIG. 2-FIG. 5 showed the particle counts coming out the filter for various filter startup treatment conditions. The particle data was collected in 1 minute intervals. The testing was performed using 0.05 μm (FIG. 2 and FIG. 3) and 0.01 μm Impact Plus UPE filters (FIG. 4 and FIG. 5). The particle counts were plotted versus dispense time and dispense volume respectively for 0.05 μm and 0.01 μm filters.

For 0.05 μm filter started up by "Best Known" method, the particle counts did not reach 1 particle count/mL>0.2 μm after dispensing 5000 mL fluid (nearly 100 holdup volumes), representing 260 minutes dispense time. Soaking a filter for 1 hour in the dispense liquid after introducing fluid into the filter improved filter startup. Compared to the best know method, particle counts after soaking reached less than 1 particle count/mL>0.2 μm in about 200 minutes, or about 3700 mL dispense volume (about 70 dispense volumes of liquid treated). Pressuring the filter at 13 psi for 1 hour after wetting filter upstream significantly improved the filter startup. Particle counts for the 1 hour pressure contacting dropped to less than 1 particle count/mL>0.2 μm in about 75 minutes, or about 1400 mL dispense volume (approximately 30 holdup volumes or less at 55 ml holdup volume per filter cartridge). Two filters that were tested at the same conditions gave very consistent results. (See FIG. 2 (#1 and #2)). The results shown that treatment of the exchange device can be used to reduce the number of particle counts due to heterogeneously nucleated microbubbles shed into the liquid. These results show that the contact or disposition of the liquid in embodiments of the invention with the surface features of the microporous membrane filter exchange device in the apparatus reduces the amount of microbubbles in the liquid from the surface features of the filter to an amount that is lower than the amount microbubbles in the liquid from the surface features of the filter that would be in the liquid in the absence of the contact of the liquid with surface features of the filter (best known method).

The beneficial effect of pressuring the fluid at 13 psi after filter installation and wetting upstream on the filter startup was also observed for 0.01 μm filter. As shown in FIG. 4 and FIG. 5, the system only took about 50 minutes, or about 900 mL dispense volume (about 20 exchange volumes or less), to reach counts less 1 particle/mL>0.2 μm when the filter was pressurized at 13 psi for 1 hour after installation and wetting upstream. By comparison, it took about 200 minutes, or 3700 mL fluid (about 70 exchange volumes), to reach that particle level when the filter was started up by the "Best Known" method.

The time of pressurizing fluid appeared to be a factor to filter startup. Particle performance of pressurizing fluid for 1 hour was slightly better than pressurizing for 15 minutes; both treatment showed reduced particle counts with time on filter startup when compared to the "Best Known" method.

Although the disclosure has provided considerable detail with reference to certain preferred embodiments thereof, other versions are possible. Therefore the spirit and scope of the appended claims should not be limited to the description and the preferred versions contain within this specification.

What is claimed is:

1. A method comprising:
   subjecting an exchange device to a reduced pressure provided by a reduced pressure means coupled to the exchange device, the exchange device having a submicron filtering membrane and one or more surface features, the exchange device coupled to a housing having an inlet coupled to a reservoir containing a liquid, the housing coupled to a liquid transport means; and
   subsequent to said subjecting the exchange device to the reduced pressure, directing the liquid, via the liquid transport means, through the exchange device and the submicron filtering membrane of the exchange device, said directing the liquid including contacting the one or more surface features of the exchange device with the liquid, the one or more surface features comprising one or more microbubble nucleating surface features, one or more microbubble trapping surface features, or a combination thereof,
   wherein said reduced pressure and said contacting reduce a number of microbubble particle counts in the liquid to a lower number than in the absence of said reduced pressure and said contacting of the liquid with the one or more surface features of the exchange device.

2. The method of claim 1, further comprising exchanging mass, energy, or a combination thereof between the liquid and the exchange device.

3. The method of claim 1, further comprising dispensing the liquid treated by the exchange device onto a substrate.

4. The method of claim 1, wherein the contacting comprises pressurizing the liquid in contact with the one or more surface features to displace or dissolve gas from the one or more surface features of the exchange device.

5. The method of claim 1, wherein the contacting comprises pressurizing the liquid in contact with the one or more surface features to displace and dissolve gas from the one or more surface features of the exchange device.

6. The method of claim 4, wherein the number of microbubble particle counts in the liquid is fewer than 1 microbubble particle count greater than about 0.2 microns in size per milliliter of liquid treated after less than about 30 hold-up volumes of liquid has been treated by the exchange device.

7. An apparatus, comprising:
an exchange device having a submicron filtering membrane and one or more surface features, the one or more surface features comprising one or more microbubble nucleating surface features, one or more microbubble trapping surface features, or a combination thereof, the exchange device subject to a reduced pressure provided by a reduced pressure means coupled to the exchange device to remove gas from the one or more surface features of the exchange device; and
a housing for the exchange device, the housing having an inlet coupled to a reservoir containing a liquid, the housing coupled to a liquid transport means, the liquid transport means directing the liquid through the exchange device and the submicron filtering membrane of the exchange device to contact the one or more surface features of the exchange device,
wherein said reduced pressure and said contacting reduce a number of microbubble particle counts in the liquid to a lower number than in the absence of said reduced pressure and said contacting of the liquid with the one or more surface features of the exchange device.

8. The apparatus of claim 7, wherein the exchange device is coupled to a pressure means for pressurizing the liquid in contact with the one or more surface features of the exchange device to displace and dissolve gas from the one or more surface features of the exchange device.

9. The apparatus of claim 7, wherein the exchange device is coupled to a pressure means for pressurizing the liquid in contact with the one or more surface features of the exchange device to displace or dissolve gas from the one or more surface features of the exchange device.

10. The apparatus of claim 9, wherein the number of microbubble particle counts in the liquid is fewer than 1 microbubble particle count greater than about 0.2 microns in size per milliliter of liquid treated after less than about 30 hold-up volumes of liquid has been treated by the exchange device.

11. The apparatus of claim 7, wherein the housing further comprises an outlet for dispensing the liquid treated by the exchange device onto a substrate.

12. The apparatus of claim 7, wherein the one or more surface features of the exchange device have a first surface energy and the liquid has a second surface energy different than the first surface energy.

13. The apparatus of claim 7, wherein the exchange device comprises a heat or mass exchange area of greater than about 100 cm$^2$, 1,000 cm$^2$, or 10,000 cm$^2$.

14. The apparatus of claim 7, wherein the submicron filtering membrane comprises a 0.05 micron filter.

15. The apparatus of claim 7, wherein the submicron filtering membrane comprises a 0.01 micron filter.

\* \* \* \* \*

UNITED STATES PATENT AND TRADEMARK OFFICE
CERTIFICATE OF CORRECTION

| | | |
|---|---|---|
| PATENT NO. | : 8,777,189 B2 | Page 1 of 1 |
| APPLICATION NO. | : 11/919110 | |
| DATED | : July 15, 2014 | |
| INVENTOR(S) | : Zahka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1509 days.

Signed and Sealed this
Eleventh Day of August, 2015

Michelle K. Lee
*Director of the United States Patent and Trademark Office*